UNITED STATES PATENT OFFICE.

MINGE WILKINS, OF SELMA, ALABAMA.

PROCESS OF TREATING PEANUTS.

984,334.     Specification of Letters Patent.     Patented Feb. 14, 1911.

No Drawing.     Application filed June 6, 1910. Serial No. 565,333.

*To all whom it may concern:*

Be it known that I, MINGE WILKINS, a citizen of the United States, residing at Selma, in the county of Dallas and State of Alabama, have invented certain new and useful Improvements in Processes of Treating Peanuts; and I do hereby declare the following to be a full, clear, and exact description of the invention, such as will enable others skilled in the art to which it appertains to make and use the same.

My invention relates to improvements in processes for treating peanuts, and the object of my invention is to apply a preservative coating to the peanuts that will prevent them from becoming stale and that will be disguised so that it will not be noticed in trade.

In carrying out my invention, I take peanuts free of mold and blight. These are then roasted in a mechanical roaster until the shells attain a uniform brown tint. They are then subjected to a water bath at a temperature of about 200° F. to make the shells more porous. Then they are put into a rapidly revolving cylinder containing melted paraffin, and after remaining in the praffin bath for a short time they are removed and put into another rapidly revolving cylinder containing pulverized bicarbonate of soda. After a short treatment in this second cylinder, they are removed and ready for sale.

The treatment of the peanuts or other articles with hot water renders the shells more porous, so that the paraffin will soak into the outer part of the shells more easily. Then the treatment with pulverized bicarbonate of soda removes the glossy appearance naturally due to the paraffin and restores them practically to the normal appearance of roasted peanuts.

From considerable experience in this line, I have found that while ordinarily roasted peanuts will become stale inside of a week, peanuts treated in this manner will remain fresh for several months. Furthermore, the appearance and salability of the nuts are not in the slightest degree injured.

Having thus described my invention, I claim:—

1. The process of treating peanuts, which consists in roasting the same, then treating them with hot water, then treating them with a liquid air-excluding agent, which soaks into the shell, and finally treating them with an agent which restores them to their natural appearance, substantially as described.

2. The process of treating peanuts, which consists in roasting them, treating them with hot water, then treating them with liquid paraffin, and finally treating them with pulverized bicarbonate of soda, substantially as described.

In testimony whereof, I affix my signature, in presence of two witnesses.

MINGE WILKINS.

Witnesses:
J. L. BISHOP,
ELI MAZE.